Figure 1:
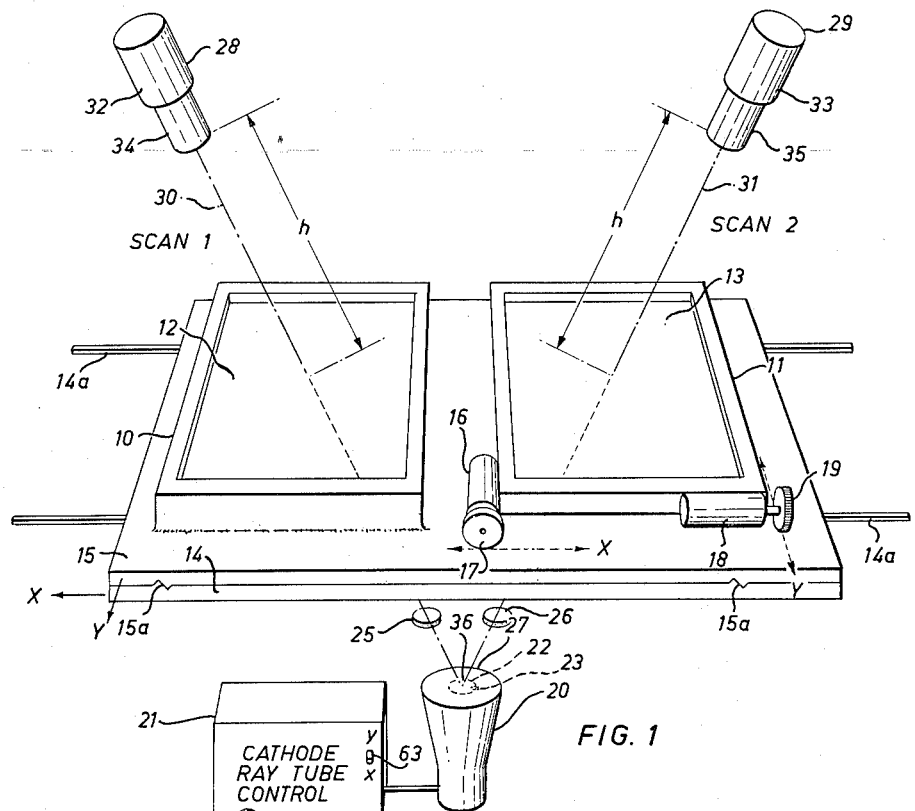

Dec. 13, 1960

G. L. HOBROUGH 2,964,642

METHODS AND APPARATUS FOR CORRELATING
CORRESPONDING POINTS IN TWO IMAGES

Filed Aug. 23, 1957

2 Sheets-Sheet 1

Inventor
GILBERT L. HOBROUGH by: J. Richard Cavanagh
Patent Agent

United States Patent Office 2,964,642
Patented Dec. 13, 1960

2,964,642

METHODS AND APPARATUS FOR CORRELATING CORRESPONDING POINTS IN TWO IMAGES

Gilbert Louis Hobrough, Oshawa, Ontario, Canada, assignor, by mesne assignments, to Hunting Survey Corporation Limited, Toronto, Ontario, Canada Filed Aug. 23, 1957, Ser. No. 679,978

3 Claims. (Cl. 250—220)

This invention relates to improvements in image inspecting systems and methods of applying same for obtaining information concerning a point in an image such as a photograph, and more especially concerns improvements in scanning devices adapted for use in photogrammetry.

This invention concerns improvements in the methods and apparatus of my application Serial Number 604,843 for Image Inspecting System and Method, assigned to the same assignee as this application.

In the prior art of photogrammetry, two images in the form of two stereophotographs of the same terrain are simultaneously visually inspected through optical mechanism to accomplish registry of selected points of the two photographs in order to establish the three co-ordinates of a selected point. Various types of complex apparatus have been devised to facilitate the plotting of terrain and relief maps from stereo-photographs, all of which devices depend upon the visual ability of the operator. Stereo-plotting operators are subjected to long fatigue; therefore, the prevention of human error presents a primary problem of photogrammetry. In addition, the tedious nature of the work limits the speed of operation to the speed and response of the operator, requiring the operator not only to sense, that is, identify identical points in the two photographs, but to correlate the two points in such a way as to extract three co-ordinate information from the correlating operation, which information, in turn, is applied to the plotting operation. The necessary skill in depth of perception on the part of the operator requires the special training of personnel selected for this work.

While present stereo-plotting machines are mechanically capable of carrying the co-ordinate information of a selected point, once obtained by a visual sensing and correlating operation, directly to the graphic process of providing a map or other representation of the information, the speed and accuracy of the operation is necessarily limited in all prior devices by the skill of the operator.

In my prior application a method of inspecting an image to obtain information to define a point therein is disclosed. Information is sensed from the image about the point to be defined, and an electrical signal is generated responsive to the information sensed whereby the signal and the information contained therein identify said point. The said application also discloses a method and apparatus for identifying corresponding points in two images such as stereoscopic photographic pairs, each having similar information about the point therein. One of the images is scanned about the point over a predetermined area and at a predetermined scanning rate. The other image is scanned at a corresponding rate over an area of a size similar to that of the predetermined area of the first scan. An electrical error signal is generated responsive to lack of similarity on the information scanned on the images. The error signal may be applied to correct the position of the second scan. The error signal becomes zero, when the second scan is in perfect alignment with the corresponding point in the other image. In addition to the foregoing, the said application discloses simultaneous expansion of both of the scanning patterns, sufficient to achieve a condition of correlation over large areas though the scans may not be aligned exactly on corresponding points.

In the said prior application the lack of correlation between the scans could be translated into coordinate information for the direction in which correction was required by utilizing a circular scanning pattern of slightly different size in one scan than in the other scan in a so-called "constant difference scanning method," so that under conditions of perfect alignment a uniform correlation signal would be obtained. If misalignment occurred in any direction a non-uniform correlation condition existed, from which an error signal could be derived containing phase and amplitude information corresponding to the direction of misalignment and the magnitude of the alignment error.

Method and apparatus of this invention enable improved alignment under conditions of non-uniform correlation. Corresponding scanning spots of similar size operate in the same direction on the same momentary scanning path or trace in both scans simultaneously, but the signal obtained from one of the scans has a fixed delay applied thereto, whereby to obtain a constant delay difference in a constant difference scanning method. The improvement herein set forth also embodies a further modified scanning method in which a balanced delay difference system is set forth whereby better to define misalignment directional information.

Having regard to the foregoing the objects and details of the invention will be understood by a study of the following specification setting forth preferred practice of the invention taken in conjunction with the accompanying drawings.

Figure 2:
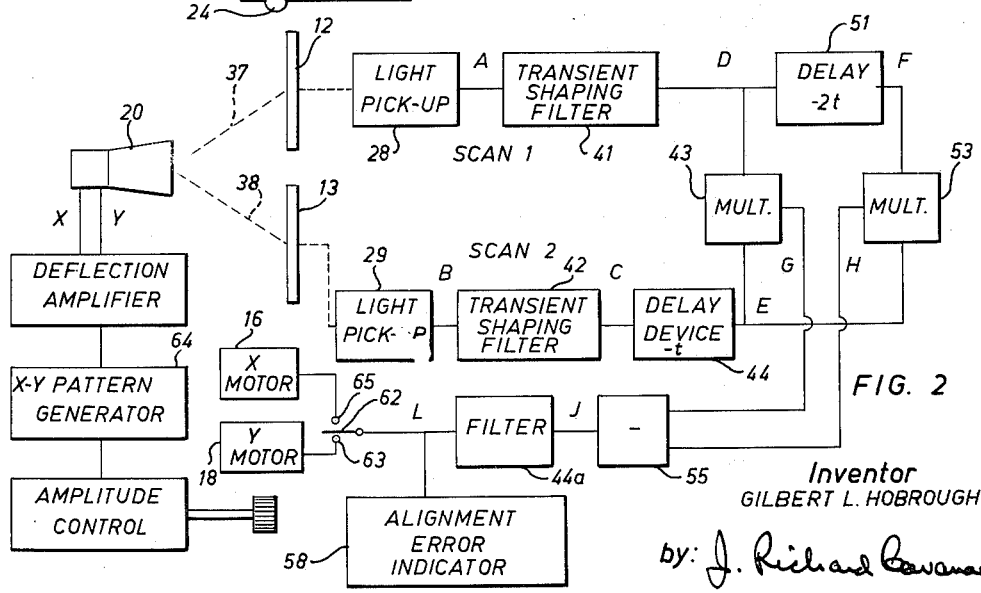
Figure 3:
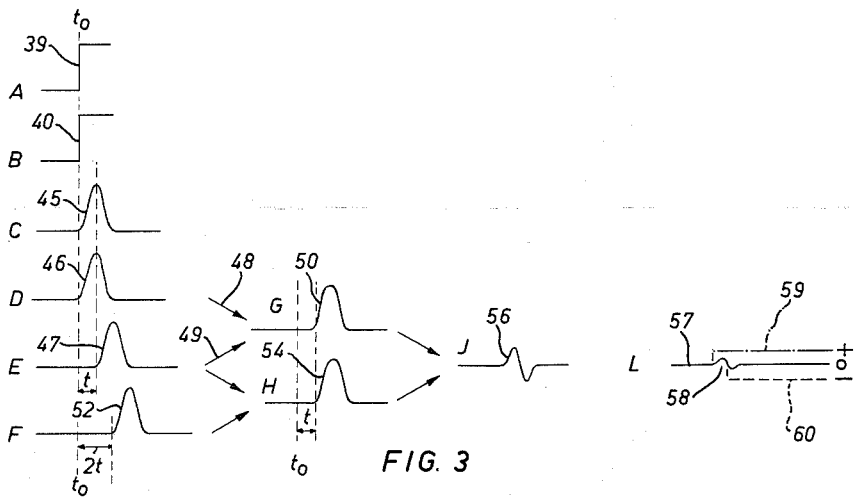
Figure 4:
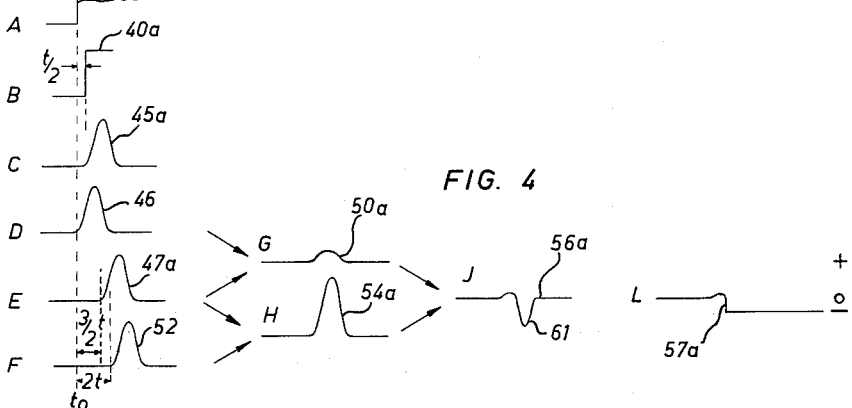
Figure 5:
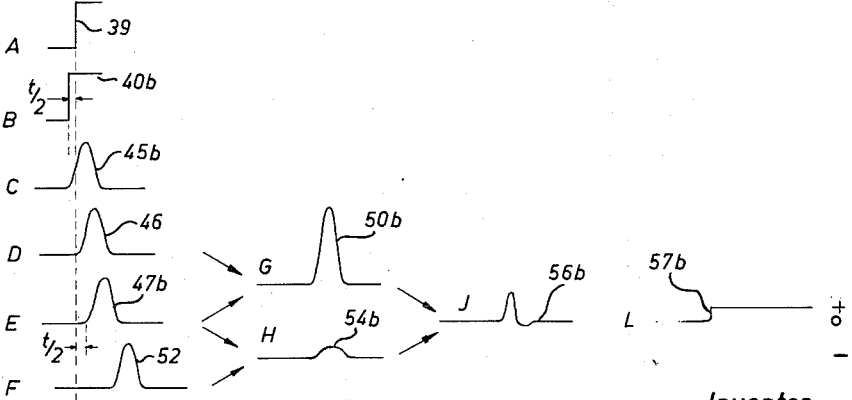

In the drawings:

Figure 1 is a diagrammatic perspective of a suitable representation of the scanning of a stereoscopic pair of photographic images by the system and method herein;

Figure 2 is an electrical schematic of known electronic and electrical components arranged and combined according to the invention to provide an output signal driving an error indicator of any suitable well-known form adapted to reveal the direction and magnitude of misalignment of the scanning axis of one scan from a point in the image which is scanned thereby corresponding to a predetermined selected point on the other image intersected by the axis of the other scan;

Figure 3 reveals the waveform of a signal at the various points A to L of the electrical schematic of Figure 2 under a condition of uniform correlation or perfect alignment, at which each of the scan axes intersects the same point in each image;

Figure 4 reveals the signal wave forms at points A to L of the circuitry of Figure 2 for a condition of misalignment in the direction of momentary scanning motion;

Figure 5 reveals signal wave forms at points A to L in the circuit diagram of Figure 2 for a condition of misalignment in a direction opposite to that of momentary scanning motion.

In the drawings one preferred form of scanning apparatus according to the invention is illustrated in Figure 1 in which the frames 10 and 11 shown in diagrammatic form are adapted each to carry one image such as one positive transparency or plate of a pair of stereographic transparencies designated respectively by numerals 12 and 13. The frame supporting base 14 is moveable laterally in one co-ordinate direction on rails or guides 14a. A frame carrier 15 is slidable on guide means 15a in another co-ordinate direction on base 14. Frame 10 is fixed to carrier 10, image 12 being moveable therewith. The carrier 15 and base 14 embody openings (not shown) through which light may pass to images 12 and 13. An X co-ordinate servo motor 16, having a driving wheel 17, moves frame 11 on carrier 15 in an X co-ordinate direction. Y co-ordinate servo motor 18 having a drive wheel 19 rotatable thereby, moves the frame 11 on carrier 15 in a Y co-ordinate direction.

In one preferred form of apparatus a conventional cathode ray tube 20, driven by suitable cathode ray tube control 21 of conventional construction, generates a scanning pattern 22 with a suitable small scanning spot 23 of a scanning pattern size controllable by the control knob 24. Suitable lenses 25 and 26 are aligned between the screen 27 of cathode ray tube 20 and light pick up devices in the form of photo multiplier tubes 28 and 29 to define scanning axes 30 and 31 for respective image scans hereinafter sometimes defined as scan 1 and scan 2. The photo multiplier devices 28 and 29 are contained within suitable casings 32 and 33, having lens systems 34 and 35 respectively associated therewith for providing the desired optical axis in each case. Each of the light pick up devices is disposed at equal angular and distance relation $h$ from the screen 27 and images 12 and 13.

The scanning pattern appearing upon the screen 27 is such that the scanning dot may move in a random or predetermined pattern about the intersection of the axes 30 and 31, that is about the centre 36 of the screen. As a result each of the light pick up devices 28 and 29 will see the same scanning pattern on the images 12 and 13, and if both images are in alignment with respect to the axes 30 and 31 the axes will be passing through identical points in the images and the latter may be said to be in perfect alignment in respect of the particular point only. If a scanning dot, at any instant, is traversing a different image dot in one image than in the other a condition of perfect correlation cannot exist. It will likewise be apparent that there may be a condition wherein the scanning dot during a portion of its pattern travel may encounter identical image information in each image, but in another portion of its travel may encounter different information in each image. There may, therefore, be a condition of misalignment in one direction which can be expressed in terms of co-ordinate error. The circuitry of Figure 2 illustrates the system of the invention by which co-ordinate information in respect of alignment error may be expressed.

Retaining the same numerals to identify similar components, the cathode ray tube 20 provides a light signal which is projected by the lens system illustrated in Figure 1 by the separate paths 37 and 38 to the images 12 and 13 and thence to the light pick up devices 28 and 29 adapted to develop transient signals which may, by way of example, be represented by wave forms 39 and 40 shown at A and B respectively of Figure 3 for the points A and B of Figure 2. For convenience, the dual channel signal handling is identified in Figure 2 by the terms scan 1 and scan 2. The signals at A and B are passed through transient shaping filters 41 and 42 of conventional construction to provide wave forms at C and D of substantially Gaussian form. The signal at D is then split and communicated to a conventional signal multiplier 43, in which it is multiplied against a delayed signal scan 2 shown at E and having a fixed delay time constant introduced therein of a value "$t$" provided by passing the signal at C through the delay device 44. These functions are represented in Figure 3 by the wave form 45 at C beginning at a time reference "$t_0$." Likewise, the wave form 46 at D begins at a time instant "$t_0$," whereas the wave form 47 at E is delayed by a time interval "$t$." The arrows 48 and 49 are intended diagrammatically to indicate the multiplication of the wave forms 46 and 47 to obtain the wave form 50 at G, that is, at the output of the multiplier 43.

The other portion of the split signal at D is passed through a delay device 51 effecting a time delay therein of a magnitude "$2t$" as represented by the wave form 52 shown at F in Figure 3. Delayed signal 52 at F is likewise multiplied in multiplier 53 with the delayed signal from E to provide multiplied signal to 54 at H, having the same delay "$t$" with respect to signal 50. The signals 50 and 54 at G and H are then subtracted in a conventional subtracting device 55 to provide a combined wave form 56 at J having in the ideal case an equal positive and negative excursion of the same form. A smoothing filter 44a is applied to the wave form 56 at J to render the same essentially a zero value, since the signal contains negligible or zero direct current component. The filtered form of the signal is designated by the numeral 57 at L in Figure 3 wherein a small ripple 58 is still evident, but wherein designations 59 and 60 follow the direction and possible level of positive and negative excursions respectively. A suitable alignment or correlation indicator 58 may be utilized to indicate a zero signal under the conditions described responsive to the wave form 57 at L.

Assume, by way of example, that the scanning spot in a given moment is travelling in a predetermined path, as determined by control device 21, but that the information seen by scan 2 is delayed, for example, by a time interval $t/2$ due to image misalignment in the direction of scanning spot motion on the momentary scanning path direction. The wave form at B as shown in Figure 4 will then be of a form 40a. The wave form 45a will embody a similar delay, and the wave form at E will embody a similar further increment of delay, so that the wave forms 47a and 46, when multiplied, will be substantially out of registry in respect to time, and will provide a wave form 50a at G of effectively negligible amplitude. Further, when the signal 47a is multiplied with signal 52 it will be in closer time registry therewith and will provide a multiplied signal 54a of substantial amplitude at H greater than that of the signal 54 in Figure 3. The signals 50a and 54a when subtracted at 55 will give a signal 56a at J of substantial negative direct current component, that is, having a substantially dominant negative excursion 61, whereby, upon filtering, a negative direct current signal 57a is obtained of an amplitude corresponding or responsive to the degree of misalignment in the Y direction, that is in a direction corresponding to the momentary direction of scan.

Figure 5 represents corresponding signals at corresponding points for revealing misalignment in a direction opposite to the momentary direction of scan. The changed wave forms are designated by the subscript $b$. It is of interest to observe that the signals 46 and 47b will be of closer registry in time, and that therefore the signal 50b is of substantial amplitude, whereas the signal 54b is of negligible amplitude in view of the lack of registry in time of the signals 47b and 52. In effect therefore, the signal 57b embodies a positive direct current signal.

The present apparatus and system is adaptable to various modes of operation for the examination of information in images and in particular for the examination of stereoscopic pairs. Consider, for example, any momentary direction of scan or scanning trace of the scanning dot on the screen of the cathode ray tube 20. The alignment error indicator 58 will show at any moment the error in alignment in the momentary direction of scan of image 13 as compared with image 12. The alignment error may be positive or negative. If positive, the error is in the direction of the momentary scanning trace, whereas if negative the error is in the opposite direction to that of the momentary scanning trace.

The foregoing considerations may be utilized in the examination of stereoscopic pairs of images of the aerial survey type by noting that the images will correspond in the direction of the Y axis, but will embody differences in the X axis direction which are a function of the elevation of the topography photographed. Accordingly, the cathode ray tube control device 21 may first provide a Y axis trace, such scanning form being well-known in cathode ray tube control arts, the scanning pattern being in the form of a scan trace in the positive Y axis direction. The alignment error indicator will thus show a positive or negative Y axis alignment error enabling manual adjustment of frame 11 to reduce the error to zero. Alternatively, as shown in Figure 2, the switch 62 carrying alignment error signal may be contacted to the switch contact 63 thereby energizing the Y co-ordinate servo motor 18 automatically effecting motion of frame 11 until the alignment error signal reduces to a value insufficient to drive the servo motor. The signal at L is shown communicating directly to the Y motor at 18, or alternatively to the X motor at 16 to indicate that the latter are responsive to such signal. Skilled persons will appreciate that the motor 16 and 18 are made responsive to such signal through suitable bridge control amplifiers or other well-known expedients, whereby the motors are sufficiently energized to overcome their inherent inertia for a practical driving force until the alignment error signal becomes zero.

As soon as Y co-ordinate alignment is achieved as above outlined the cathode ray tube control device also embodying an X and Y axis switch 63 controlling the pattern generator 64 is switched to the X axis position to provide an X axis scanning trace. Again the alignment error indicator will indicate the magnitude and sign of alignment error in the X axis direction. Manual adjustment of frame 11 may be employed to bring this error to zero. Alternatively, switch 62 may be moved to engage contact 65 energizing the X servo motor, and effecting automatic drive by motor 16 of frame 11 to achieve zero alignment error. Upon achieving zero alignment error for corresponding points in the two images the motion of frame 11 relative to the frame 10 required to achieve zero alignment error for any other set of corresponding points will be a function of the difference in elevation between the first set of points and the second set of points. Accordingly, knowing the elevation of one point in the images, the frame 11 may be positioned relative to a reference elevation. Thereafter the magnitude of alignment error or the distance of travel of frame 11 in the X co-ordinate direction will be a function of elevation from the reference elevation.

In operation an operator may be informed as above outlined of the momentary alignment error by the alignment error indicating device. In the described example of uni-directional scanning a uni-directional examination is made along one axis. The examination could be made in any other axis direction, but in the present example an X and Y co-ordinate examination is convenient for the extraction of information from aerial survey stereographic pairs of images. The only essential is that the direction of scanning trace be known at the moment of alignment error indication. A straight line scanning trace reduces the system to its simplest form, though more complex forms of scanning pattern will be readily apparent to skilled persons.

In a more general sense the invention enables the location of corresponding points in two images, each of which embodies similar information about the said point therein. A scanning spot which may be provided by any suitable optical system such as a cathode ray tube and associated lenses of the kind disclosed or equivalent is moved simultaneously over each of the images on a path which, at any one moment, is of predetermined direction. The information encountered in each image by the scanning spot during motion on the momentary path is sensed or detected by a suitable means such as photocells, photo multiplier tubes or the like to provide a transient signal for each image which is generated responsive to the information sensed. One of the information signals so obtained is delayed with respect to the other by a predetermined constant unit of time which skilled persons will realise should be less than that corresponding to the high frequency response of the sensing system. The delayed signal is then correlated with the other transient signal, such as by a multiplying operation and circuitry to obtain a combined signal containing information adapted to be employed as an alignment error signal having a direct current component responsive in amplitude and sign to the magnitude and direction of error of alignment of said point in said images.

While the application of a constant delay to the transient signal obtained from one of the images enables a usable alignment error signal to be obtained from cross-correlation of the delay signal with the other transient signal, the resulting alignment error signal may be subject to inaccuracies arising from image pattern characteristics such as variation in density and the ilke. In a preferred sense therefore the more complete system disclosed herein by way of example and having a second delay cross-correlated combined signal is preferred in order to eliminate any effects of image pattern or characteristic other than the specific information desired to be extracted. In this sense the more complete system herein specifically disclosed may be referred to as a balanced constant difference system wherein one of the image transient signals is delayed by a constant time unit with respect to the other and cross-correlated, such as by multiplying with the other signal to obtain a first combined signal. Additionally, the other signal is delayed by a double constant time interval and cross-correlated with the first delayed signal to obtain a second combined signal. The combined signals are then processed such as by subtracting to obtain an alignment error signal having a direct current component truly responsive in amplitude and sign regardless of image characteristic to the magnitude and direction of error of alignment of the information defining the point desired to be correlated in the images.

Once alignment is achieved for any pair of corresponding points in images 12 and 13 both images are moved together by shifting base 14 and carrier 15 as may be desired to effect a scanning of new areas of the images to define a new point in image 12. The image 13 will thereafter be moved manually by frame 11 on carrier 15 or by the servo motors, as desired, to reduce the error signal to zero to obtain alignment on the new set of points. The magnitude of the error signal in this case or the motion required in the scanning direction to reduce the error signal to zero will be a function of the difference in elevation between the first and second pairs of corresponding points if momentary scanning is made in the X axis direction on aerial survey stereographic photographic images.

What I claim as my invention is:

1. The method of locating corresponding points in two images each having similar information about the said point therein and comprising: moving a scanning spot simultaneously over each of said images on a momentary path of predetermined direction to define one of said corresponding points; independently sensing the information encountered in each image by said scanning spot during motion on said momentary path and generating a transient signal for each image responsive to the information sensed; delaying one of said information responsive signals with respect to the other by a predetermined constant unit of time; cross-correlating said one delayed signal with said other signal to obtain a combined signal therefrom; extracting an alignment error signal from said combined signal, said error signal having a direct current component responsive in amplitude and sign to the magnitude and direction of error of alignment of said point in said images; establishing a predetermined direction of motion of said scanning spot on a co-ordinate axis of said images; continuing motion of said scanning spot on said path while moving one of said images to reduce said error signal to zero whereby to align said images with respect to said axis; and thereafter moving said scanning spot in another predetermined direction at right angles to said first axis, thereby to establish a second co-ordinate axis for said images.

2. The method of locating corresponding points in a pair of aerial survey stereographic images, each having similar information about the said point therein, and having an X co-ordinate axis extending in the direction of flight, and a Y co-ordinate axis at right angles to said X co-ordinate axis transversely of the line of flight, and comprising: moving a scanning spot simultaneously over each of said images on a momentary path of predetermined direction to define one of said corresponding points; independently sensing the information encountered in each image by said scanning spot during motion on said momentary path and generating a transient signal for each image responsive to the information sensed; delaying one of said information responsive signals with respect to the other by a predetermined constant unit of time; cross-correlating said one delayed signal with said other signal to obtain a combined signal therefrom; extracting an alignment error signal from said combined signal, said error signal having a direct current component responsive in amplitude and sign to the magnitude and direction of error of alignment of said point in said images; establishing said momentary path of motion of said scanning spot in the Y axis direction, and moving one of said images to reduce the Y axis alignment error signal to zero; thereafter establishing said momentary path of scanning spot motion in an X axis direction; moving one of said images to reduce the alignment error signal to zero for said corresponding points; and shifting the path of the said spot on both of said images while maintaining the X co-ordinate direction thereof to locate another point therein whereby the alignment error signal so obtained contains information of the relative elevation between said corresponding points and said other point.

3. The method of locating corresponding points in two images each having similar information about the said point therein and comprising: moving a scanning spot simultaneously over each of said images on a momentary path of predetermined direction to define one of said corresponding points; independently sensing the information encountered in each image by said scanning spot during motion on said momentary path and generating a transient signal for each image responsive to the information sensed; delaying one of said information responsive signals with respect to the other by a predetermined constant unit of time to obtain a first delayed signal; cross-correlating said first delayed signal with said other signal to obtain a first combined signal therefrom; delaying said other signal a constant time interval corresponding to twice said predetermined unit of time to obtain a second delayed signal; cross-correlating said first and second delayed signals to obtain a second combined signal therefrom; generating an alignment error signal responsive to both said first and second combined signals and having a direct current component corresponding in amplitude and sign to the magnitude and direction of the error of alignment of said points in said image; establishing the predetermined direction of motion of said scanning spot on a coordinate axis for said images; continuing motion of said scanning spot on said path while moving one of said images to reduce said error signal to zero whereby to align said images with respect to said axis; and thereafter moving said scanning spot in another predetermined direction at right angles to said first axis thereby to establish a second co-ordinate axis for said images.

References Cited in the file of this patent

UNITED STATES PATENTS

| 2,534,843 | Wallace | Dec. 19, 1950 |
| 2,659,823 | Vossberg | Nov. 17, 1953 |
| 2,679,636 | Hillyer | May 25, 1954 |
| 2,703,150 | Rieber | Mar. 1, 1955 |
| 2,787,188 | Berger | Apr. 2, 1957 |

UNITED STATES PATENT OFFICE
CERTIFICATE OF CORRECTION

Patent No. 2,964,642　　　　　　　　　　　　December 13, 1960

Gilbert Louis Hobrough

It is hereby certified that error appears in the above numbered patent requiring correction and that the said Letters Patent should read as corrected below.

In the drawings, Sheet 1, Fig. 1, and column 5, line 28, for "63", each occurrence, read -- 63a --.

Signed and sealed this 27th day of March 1962.

(SEAL)
Attest:

ERNEST W. SWIDER
Attesting Officer

DAVID L. LADD
Commissioner of Patents